Feb. 7, 1950    E. H. LAND    2,496,630
APPARATUS FOR EXPOSING AND PROCESSING
PHOTOGRAPHIC FILM
Filed May 31, 1946    2 Sheets-Sheet 1

INVENTOR
Edwin H. Land
BY
Donald L. Brown
Attorney

Feb. 7, 1950 E. H. LAND 2,496,630
APPARATUS FOR EXPOSING AND PROCESSING
PHOTOGRAPHIC FILM
Filed May 31, 1946 2 Sheets-Sheet 2

INVENTOR
Edwin H. Land
BY Donald L. Brown
Attorney

Patented Feb. 7, 1950

2,496,630

UNITED STATES PATENT OFFICE 2,496,630

APPARATUS FOR EXPOSING AND PROCESSING PHOTOGRAPHIC FILM

Edwin H. Land, Cambridge, Mass., assignor to Polaroid Corporation, Cambridge, Mass., a corporation of Delaware Application May 31, 1946, Serial No. 673,404

13 Claims. (Cl. 95—13)

This invention relates to photography, and more particularly to camera apparatus.

One object of the present invention is to provide novel apparatus for forming a positive print of the subject image of a photographically exposed film.

Another object of the present invention is to provide novel camera apparatus for a film pack comprising a plurality of film units wherein said film units may be exposed and thereafter processed as by compression to have a positive photographic print formed therein.

A further object of the present invention is to provide novel camera apparatus comprising a magazine and magazine holder for supplying a plurality of film units of a self-contained type adapted to formation of positive photographic prints therein and comprising as a part thereof a photosensitive layer, a print-carrying layer and a processing fluid, the camera apparatus including means for causing the fluid in each film unit to permeate the photosensitive layer and thereby to form in said unit a positive print of the subject image to which the film has been exposed.

Still another object of the present invention is to provide novel camera apparatus having film holding means of a magazine type incorporating a light-shielding portion which permits loading of the magazine in the camera in actinic light, and which may thereafter be removed for photographically exposing and processing the film.

A still further object of the present invention is the provision of novel camera apparatus, of the aforesaid type for forming positive photographic prints, comprising a magazine for releasably retaining a plurality of cut films, the magazine having means for ejecting films therefrom.

Still another object of the present invention is to provide novel camera apparatus for photographically exposing and processing a plurality of composite photosensitive film units and for forming positive prints of the subject images thereof, the apparatus comprising propulsive means for moving the film units to exposure position and from exposure position into engagement with means for processing the film and forming positive prints therein.

Yet another object of the present invention is to provide novel camera apparatus for photographically exposing and processing a plurality of composite photosensitive film units and for forming positive prints of the subject images thereof, the apparatus comprising propulsive means for moving the film units to exposure position, and from exposure position into engagement with means for processing the film, each of said means coacting with the other so that engagement of either means with the film commences substantially at the time engagement of the other means terminates.

A still further object of the present invention is to provide novel camera apparatus adapted to propel, photographically expose, and process a plurality of film units supplied from a magazine, each of said units comprising several layers and a collapsible container enclosing a photographic processing fluid positioned between said layers, the propulsive and processing elements of the apparatus comprising a plurality of pressure rollers, certain of said rollers being adapted to engage marginal portions, only, of said film for propulsion thereof, and other of said rollers being adapted to engage portions of said film intermediate of said marginal portions for further propelling said film, for compressing said container and releasing the fluid therein, and for spreading the released fluid between the aforementioned layers of film.

Still another object of the present invention is the provision of novel camera apparatus comprising a displaceable light-tight chamber adapted to receive and releasably retain a plurality of processed film units of the aforesaid type, said chamber preferably being mounted for movement to either an operative or nonoperative position and, when in operative position, having access means for removal of a positive print-bearing unit therefrom.

These and other objects of the invention will in part be obvious and will in part appear hereinafter.

The invention accordingly comprises the apparatus possessing the construction, combination of elements, and arrangement of parts which are exemplified in the apparatus hereinafter described, and the scope of the application of which will be indicated in the claims.

In the drawings, wherein like reference characters refer to like parts throughout the several views.

Figure 1:
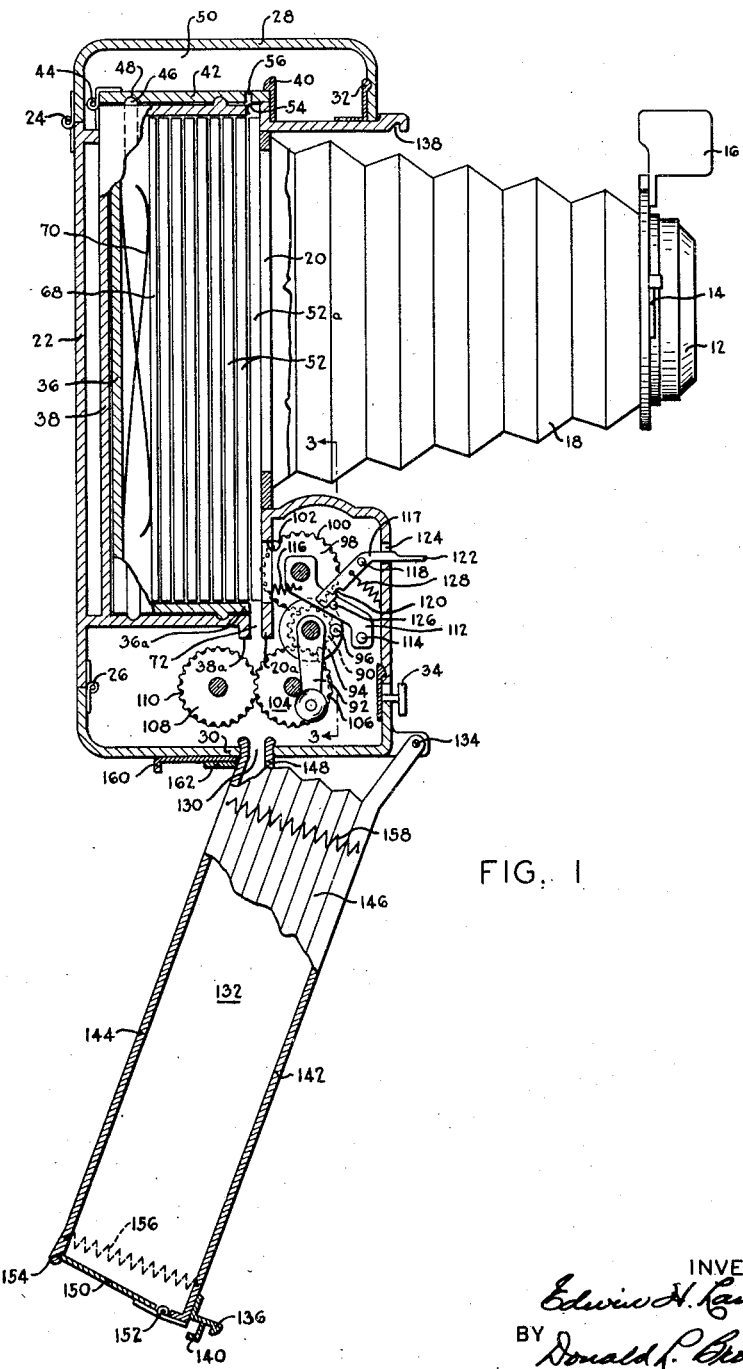
Figure 1 is an elevation view, partly in cross-section and with parts broken away, of one form of the novel camera apparatus of the invention.
Figure 3:
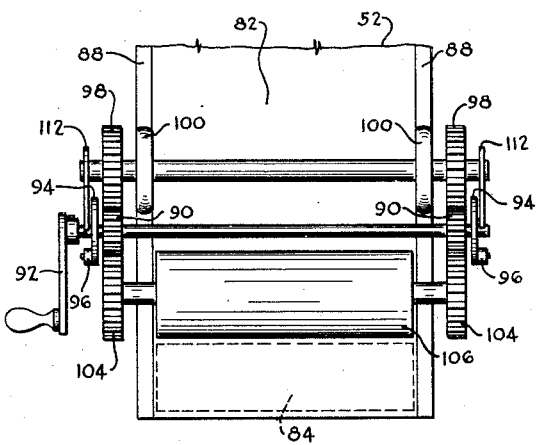
Figure 4:
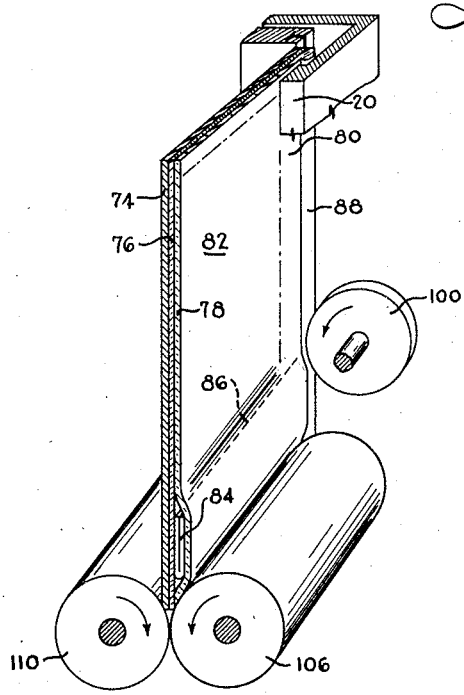

Fig. 3 is a front elevation view of elements of the novel camera apparatus in association with a suitable composite photographic film, along the line 3—3 of Fig. 1; and Fig. 4 is a schematic, fragmentary perspective view, partly in cross-section, illustrating the operation of propulsive and compressive roller elements in conjunction with a composite photographic film material suitable for use in the camera apparatus.

Referring to Fig. 1, a somewhat schematic representation of the novel camera apparatus comprising the invention is shown, said apparatus being of suitable design for photographic exposure of a plurality of photographic film units, for processing said film units, for forming positive prints of the subject images thereof, and for removal of the completed prints from the camera apparatus for viewing said prints.

Camera elements illustrated comprise lens 12, having a suitable shutter, not shown, associated therewith, shutter release 14, view finder 16, bellows 18, and framing plate 20. A camera housing suitable for supporting and enclosing the apparatus and for preventing admittance of actinic light to photosensitive film material preferably comprises a plurality of wall portions forming a plurality of light-tight chambers for releasably holding a supply of the film units, for photographically exposing said units, and for processing said units after exposure thereof. In the form of camera apparatus shown in Fig. 1, wall portion 22 forms the principal housing of the camera. Pivotally attached thereto by hinge elements 24 and 26 are external wall portions 28 and 30, respectively, said portions providing means for access to the interior of the housing and having friction latch means 32 and locking latch 34, respectively, for releasably holding said portions in closed position. The inner constructions of the camera comprise a magazine 36 removably mountable in a magazine holder 38, access to the magazine holder being accomplished by releasing friction latch 32, swinging open wall portion 28 of the camera casing, releasing locking latch 40, and by swinging open pivotally mounted portion 42 of the magazine holder on hinge element 44. The magazine may then be inserted in the holder through the portions of the camera which have been opened as above described. Rib elements 46 extending along wall portions of the magazine are provided for engaging grooves 48 formed in adjacent portions of the magazine holder, said rib and groove components facilitating positive mounting of the magazine in the holder. The combination of pivotally mounted members 28 and 42 forming chamber 50 therebetween provides means for excluding actinic light from the interior of the magazine containing film units 52, said means being supplementary to light-shielding means 54 comprising a springlike element attached to member 42 in such manner as to block aperture 56 when said member 42 is in closed position. Aperture 56 is of suitable dimensions for withdrawing therethrough a light shield of suitable form from frontal portions of the magazine after loading said magazine in the magazine holder, thus enabling the foremost film unit to be released and moved toward a position for photographic exposure thereof. It will be apparent that pivotally mounted casing portion 28 may be dispensed with in a modified design of the camera without materially affecting its operability, said portion serving as additional means for protecting photosensitive materials within the camera and providing a dust seal for aperture 56.

Figure 2:
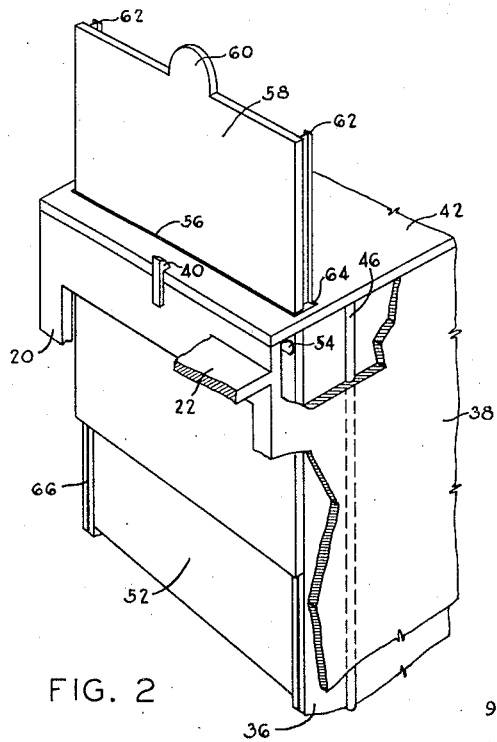
Fig. 2 is a somewhat schematic, fragmentary perspective view of elements of the film magazine and magazine holder and illustrates a method by which a form of film pack may be loaded in the camera.

A construction and relationship of elements of the magazine, magazine holder, and camera portions for mounting the magazine is more fully illustrated in Fig. 2, wherein is shown protective plate 58, constructed of sheet metal or other suitable material, and having tab portions 60, said tab being adapted to project through aperture 56 when door 42 is closed and, in said position, to provide means for withdrawing said plate 58 after loading the magazine in the magazine holder. Flange elements 62, projecting rearwardly from marginal portions of the plate, are adapted to engage similarly shaped slots 64 comprising extended portions of aperture 56 adjacent each end thereof, said slots coacting with grooves 66, and said grooves extending within and parallel to side wall portions of magazine 36. The aforesaid aperture, slots, and grooves permit both the mounting of plate 58 on magazine 36 and its removal therefrom.

Film units 52 may be loaded in the magazine and cover 58 thereafter installed in a suitable darkroom, said loading operation being accomplished by inserting the first film unit through the open side of the magazine against pressure plate 68 tensioned by compression spring 70, and by thereafter loading the balance of film units in adjacent relationship to each other.

The loaded magazine may then be installed in the magazine holder and plate 58 removed therefrom, as above described. The foremost film unit 52a is thus adapted to release from the magazine, said release and the forward movement of all succeeding film units being actuated through the influence of compression spring 70 and said foremost film unit 52a being thus brought to framed position in contact with framing plate 20. It is to be noted in Fig. 1 that the distance between front or open edge portions of the magazine and framing plate 20 is slightly greater than the thickness of a film unit and that said dimension provides a space wherein said film unit may be held through frictional contact with a succeeding film unit in framed position for photographic exposure. It is further to be noted that an aperture 72 adjacent said framed film unit is provided by a plurality of elements comprising a front edge 36a of the magazine, an extended portion 38a of the magazine holder, and an extended portion 20a of the framing plate, said aperture likewise being of a width slightly exceeding that of the film unit and providing a passage through which said film unit may be guided after its photographic exposure.

A form of composite film unit suitable for use in the camera apparatus of the invention is shown in Fig. 4 and comprises an opaque base layer 74, a photosensitive layer 76, adhering to said base layer, and a layer 78 comprising a transparent, preferably cellulosic material suitable for carrying a photographic print. Layer 78 is preferably bonded to layer 76 along marginal portions 80 only, facing areas 82 of said layers lying between said marginal portions, defined within the broken line, being substantially superposed throughout but unbonded to one another and thereby being adapted to introduction and spreading of a fluid such as a photographic processing fluid therebetween. Facing areas 82 substantially comprise the photographic image portions of the composite film, namely, those portions adapted to processing and the formation therewithin or thereupon of a positive photographic print.

A collapsible container 84 enclosing a fluid of the aforesaid type and having means for directional release of said fluid as, for example, having a frangible seal along edge portions 86 thereof, is shown positioned between said layers 76 and 78 and adjacent said image areas 82. The construction of the composite film illustrated in Fig. 4 is such that upon applications of compression commencing at lower extremities of container 84 and moving progressively upward, the fluid in said container is ejected between frangible portions 86 thereof and is spread between unbonded layer portions 82 as above described. Raised or beaded portions 88 of the film extending longitudinally thereof adjacent said marginal portions 80 provide a construction whereby, when a plurality of film units are loaded in magazine 36 of Fig. 1, the compressive force of spring 70 is transmitted from one unit to another through said beaded portions only, no part of said force being borne by fluid container 84 lying therebetween, and said construction thus obviating the possibility of inadvertent collapse of the container and release of the fluid within the magazine. It will be obvious that other means may be employed for preventing undesirable subjection to pressure by the liquid container while said film is loaded in the magazine, said means comprising modifications of the film per se, or means associated with the magazine for separating film units while positioned therein.

Referring to Fig. 1 and assuming film units 52 and 52a to be generally of the above-described type, each of said film units is to be regarded as correctly positioned in the camera with its transparent print-carrier layer nearest to framing plate 20 followed in order by the aforesaid photosensitive and base layers, respectively. The fluid-enclosing container, mounted between said print-carrier and photosensitive layers, is positioned at the lower portions of the film unit adjacent aperture 72. Upon actuating shutter release 14, the subject image is transmitted by said transparent print-carrier layer to the photosensitive layer and, accordingly, photographic exposure of said last-named layer is obtained.

After the above-described exposure of the photosensitive layer, the composite film may be subjected to processing for forming a positive print of the aforementioned subject image. Mechanism suitable for the purpose comprises pinion gears 90, handcrank 92, and cam elements 94 bearing roller members 96 (Figs. 1 and 3), said gears, handcrank, and cams being rigidly attached to one another and capable of being rotated together in a clockwise direction. Pinion gears 90 are engaged with gears 98, said last-named gears being coaxially mounted and joined with friction rollers 100, clockwise rotation of pinions 90 thus acting to drive said elements 98 and 100 in a counterclockwise direction. A pair of slots 102 in extended portion 20a of the framing plate permits entrance therethrough of the periphery of said friction rollers 100 and their positioning in frictional contact with marginal portions 88 of film unit 52a. The surfacing of friction rollers 100 may preferably be of a resilient, tacky composition adapted to positive engagement with said marginal portions of the film.

Pinion gears 90 are likewise engaged with gears 104, said last-named gears being mounted upon and rigidly attached to the shaft bearing pressure roller 106, said elements 104 and 106 being rotatable in a counterclockwise direction through clockwise rotation of handcrank 92. In turn, gears 104 engage with gears 108 (one gear 108 only being shown), said last-named gears being mounted upon and rigidly attached to the shaft bearing pressure roller 110, and said elements 108 and 110 being rotatable in a clockwise direction through the aforesaid clockwise rotation of handcrank 92. Gears 108 may be omitted in a modification of design and sufficient propulsive force applied to the film through pressure roller 106 alone. Although not shown, pressure rollers 106 and 110 may preferably be spring-loaded for imparting compressive force thereto, tension being applied to their respective axes in a plane intersecting said axes.

Gears 98 and associated friction rollers 100 are pivotally mounted by means of arms 112 having pivot pins 114 (one pin only being shown) whereby said friction rollers may either be caused to engage marginal portions of the film units as illustrated or may be pivotally displaced from said position of engagement therewith as will presently be shown. Engagement of friction rollers 100 with each film unit is principally induced through coil spring 116 attached, respectively, to extended portion 20a of the framing plate and to arm 112, said spring being formed for applying a predetermined tension to said arm. It will be noted that at the position of engagement of friction rollers and film unit, as shown, roller members 96 of cams 94 are so placed, through the rotative position of said cams, as to be barely in contact with or slightly spaced from arms 112 and that said roller members in the aforesaid position exert no influence upon the pivotally adjustable position of said arms 112. Upon completing a sufficient clockwise rotation of cams 94, it is apparent that roller members 96 will be brought into contact with lower edge portions of arms 112, said lower edges being positioned to intercept arcs described by said rollers when the rollers are brought adjacent said lower edge portions of arms 112. The rollers, in describing said arcs, apply thrust to said arm portions, cause the pivotally mounted arms to move substantially upward and to the right and, accordingly, provide disengagement of gears 98 from gears 90 and disengagement of friction rollers 100 from film unit 52a.

A lever element 117, having pivotal mounting 118, indented portion 120, and depressible handle portion 122 extending through a light-shielded slot 124, formed in the camera housing substantially at right angles to the axis of said handle, is positioned for coactive operation with arm 112. An edge portion of lever 117 is held in contact with a pin 126 extending forwardly from a surface of said arm 112 through tension applied by a coil spring 128 attached to said lever 117 and to the camera casing. When arm 112 is pivotally rotated as hereinbefore described, pin 126 is caused to move along said edge of lever 117 and to enter indented portion 120 thereof, thus substantially locking the arm and lever together and, more particularly, thereby holding friction rollers 100 out of engagement with film unit 52a. Said spacing of the friction rollers from the film is maintained until lever handle 122 is depressed, thereby withdrawing indentation 120 from pin 126 and permitting arms 112 to rotate in a counterclockwise direction provided cam rollers 96 are at a nonoperative rotative position relative to said arms as hereinbefore described.

In operation the aforementioned elements function as follows: Film unit 52a is photographically exposed through actuation of shutter release 14. Handcrank 92 is rotated in a clockwise direction causing counterclockwise rotation of friction rollers 100 and, accordingly, film unit 52a is propelled through aperture 72. The film unit is then engaged and subjected to propulsion and compression by pressure rollers 106 and 110, rotating in counterclockwise and clockwise directions, respectively. After engagement of said pressure rollers and film unit, roller elements 96 have been rotated to the aforesaid position whereby thrust is applied by said rollers to arms 112, thus breaking engagement of friction rollers 100 and the film unit. Said terminated engagement of the friction rollers and film unit is maintained until lever handle 122 is depressed as hereinbefore described. Continued rotation of handcrank 92 causes pressure rollers 106 and 110 to propel and compress the entire film unit 52a therebetween. During that part of the propulsion cycle of said film unit when the trailing edge thereof has passed that portion of framing plate extension 20a which is substantially in the horizontal plane of the lower wall 36a of the magazine a succeeding film unit will be completely released from the magazine and brought to the framed position in which unit 52a is shown through the force applied by magazine compression spring 70 which tends to move all of the film units in the magazine toward said framing plate.

In passing between pressure rollers 106 and 110, as shown more clearly in Fig. 4, the film unit is subjected to progressive compressive stress, causing collapse of container 84, release of a photographic fluid contained therein, and spreading of said fluid over at least image portions 82 of said film unit including permeation of the photosensitive layer by said fluid. Said operations contribute to processing of the photosensitive layer of said film and formation of a positive photographic print of the subject image of said photographic exposure upon predetermined layer portions of said films. Fig. 4 also shows the construction of a suitable framing plate 20 wherein indented portions thereof receive projecting portions 88 of the film and prevent lateral displacement of said film when in framed position. Fig. 3, taken along the line 3—3 of Fig. 1 shows preferred gearing and shafting of propulsive and compressive means wherein it will be observed that said shafting extends transversely of the film unit, beyond both longitudinal edges thereof, and permits a duplication of the gearing, friction rollers, cams, cam rollers, and arms shown in Fig. 1, said constructions providing a more positive and evenly regulated propulsion and compression of the film unit. Fig. 3 also illustrates the position of pressure rollers (roller 106, only, being visible due to the showing in elevation) with respect to collapsed container 84 and image areas 82, it being assumed that a photographic fluid, released from said container, as previously described, is undergoing spreading between unbonded layer portions of the film unit comprising said image areas 82.

From the pressure rollers 106 and 110, the film unit is propelled through a transverse slot 130 (Fig. 1) formed in camera casing 22, said slot having a breadth and length slightly in excess of the thickness and width, respectively, of the film unit, said slot extending substantially across said casing 22 and lying in the plane of film travel. The film unit is propelled through the aforesaid slot and either emerges directly from the camera or is passed into the chamber 132 depending upon whether said chamber is utilized, as will presently be considered. When chamber 132 is employed, completion of passage of the film unit thereinto is principally by means of gravitational force and it will be seen that maintenance of said chamber in the position shown provides an angular arrangement of chamber casing elements whereby a plurality of said film units may be received and automatically arranged in successive order.

For the purpose of providing a compact camera for carrying or storage purposes, receiving or storage chamber 132 may be collapsed and pivotally rotated on pivot element 134 to a mounting position at the front of the camera, after bellows portions 18 thereof have been compressed and locking latch elements 136 and 138 mutually engaged, said first-named latch element having depressible release means 140. The form of receiving chamber shown comprises two substantially rigid casing portions 142 and 144 formed from a sheet metal or other suitable opaque material, and bellows-like casing portions 146 forming a top and two side wall parts of said chamber. Two interconnected resilient lug members 148, preferably formed from a resilient metal, extend upwardly from and transversely across the top of said chamber 132, said members forming therebetween a slot-like aperture adapted to insertion in the aforementioned slot 130 formed in casing 22, said aperture being adapted to the passage therethrough of a film unit and lugs 148 serving as means contributive to the holding of said chamber in correct operative position for reception of film units. The lower enclosing portion of said chamber comprises means providing access to said chamber, namely, pivotally mounted door 150, pivotal means 152 therefor permitting inward or outward rotation of said door, and notch 154 formed adjacent an end portion of chamber casing 144, said notch being of suitable dimensions for receiving the extremity of said door and, accordingly, for retaining said door in closed position. Coil springs 156 and 158 attached to casing portions 142 and 144 adjacent both side wall portions 146 provide compressive force which is applied to the chamber and contributes both to hold said chamber substantially rigidly when in operative position and to maintain said chamber in a collapsed condition when it is pivoted to inoperative position, said door 150 pivoting inwardly against casing portion 142 when said chamber is collapsed. When chamber 132 is pivoted to inoperative position, means for closing aperture 130 are provided, said closure means comprising strip member 160 of suitable opaque material mounted for translational movement between channeled member 162 and casing 22.

When an exposed and processed film unit undergoing propulsion has passed beyond pressure rollers 106 and 110, said position thereof will be rendered obvious to the operator through termination of its frictional engagement with said rollers and accordingly by a lesser resistance to the rotation of handcrank 92. When said position of the film has thus become apparent, handcrank 92 is preferably to be stationed at the downward position shown in Fig. 1, thus automatically reestablishing a position of cam roller elements 96, suitably spaced from or in light contact with arms 112, thus permitting engagement of friction rollers 100 with a film unit in framed position. Upon establishment of a relationship of elements as above described, photographic exposure of the succeeding framed film unit may be performed. After said exposure, lever handle 122 may be depressed, bringing friction roller 100 into engagement with marginal portions of said framed film unit and the handcrank may then be rotated for displacing said unit from framed position and for processing said unit as hereinbefore described.

It will be apparent that further modifications of camera apparatus may be made within the scope of the invention. Modified film propulsive means contemplates use of a backlash mechanism or a ratchet and pawl for obtaining the hereinbefore-described intermittent operations of friction rollers 100. Storage chamber 132, for receiving photographically exposed and processed film units, may be dispensed with entirely where film units are adapted to ejection directly from the camera after photographic exposure and processing thereof. Where, however, a type of film unit is employed requiring an elapsed time of at least several seconds during which layers thereof are preferably to be maintained in a bonded condition and unexposed to actinic light, any suitable form of light-tight chamber means may be placed adjacent the compressive means of the apparatus for receiving said film unit as, for example, a rigid box-like element or a light-impermeable bag for the purpose, the chamber shown indicating only a preferred type of chamber.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. In camera apparatus adapted to photographically expose and process a plurality of multilayer film units supplied from a magazine, each of said units comprising a photosensitive layer and a releasably contained fluid interposed between facing areas of a pair of layers thereof, the combination of elements comprising pinion means, a handcrank for actuating rotation of said pinion means, cam means coaxially mounted with said rotatable pinion means and rigidly connected thereto, arm means pivotally mounted adjacent said cam means and adapted to pivotal rotation during engagement with the maximum radius of said cam, gear means mounted adjacent an extremity of said arm means and adapted to engage said pinion during nonengagement of said cam and arm means, friction roller means coaxially mounted with said last-named gear means and rigidly connected thereto, said roller means being spring-tensioned for frictionally engaging marginal portions of a film unit positioned adjacent thereto for propelling said film unit during the aforesaid nonengagement of said cam and arm means and adapted to be separated from engagement with said marginal film portions during engagement of said cam and arm means, a pin extending from said pivotally mounted arm means, lever means spring-tensioned for contacting said pin and having a slot therein for receiving said pin during pivotal rotation of said arm means whereby said arm and lever may be locked together after a predetermined rotation of said arm means and the aforesaid broken engagement of elements may be maintained, and lever release means comprising a depressible handle portion thereof whereby said slot may be withdrawn from said pin and the engagement of separated elements may be re-established.

2. In camera apparatus adapted to photographically expose and process a plurality of multilayer film units supplied from a magazine, each of said units comprising a photosensitive layer and a releasably contained fluid interposed between facing areas of a pair of layers thereof, the combination of elements comprising pinion means, a handcrank for actuating rotation of said pinion means, cam means coaxially mounted with said rotatable pinion means and rigidly connected thereto, arm means pivotally mounted adjacent said cam means and adapted to pivotal rotation during engagement with the maximum radius of said cam, gear means mounted adjacent an extremity of said arm means and adapted to engage said pinion during nonengagement of said cam and arm means, friction roller means coaxially mounted with said last-named gear means and rigidly connected thereto, said roller means being spring-tensioned for frictionally engaging marginal portions of a film unit positioned adjacent thereto for propelling said film unit during the aforesaid nonengagement of said cam and arm means and adapted to be separated from engagement with said marginal film portions during engagement of said cam and arm means, a pin extending from said pivotally mounted arm means, lever means spring-tensioned for contacting said pin and having a slot therein for receiving said pin during pivotal rotation of said arm means whereby said arm and lever may be locked together after a predetermined rotation of said arm means and the aforesaid broken engagement of elements may be maintained, lever release means comprising a depressible handle portion thereof whereby said slot may be withdrawn from said pin and the engagement of separated elements may be re-established, and means comprising a pair of pressure rollers, one of said rollers having a gear coaxial therewith and rigidly connected thereto continuously engaging said pinion for receiving rotative force therefrom, said pressure rollers being adapted to propel and compress said film unit during nonengagement of said friction roller means with said film unit.

3. In camera apparatus to photographically expose and process a plurality of multilayer film units supplied from a magazine, each of said units comprising a photosensitive layer and a releasably contained fluid interposed between facing areas of a pair of layers thereof, the combination of elements comprising a framing plate for positioning said film units in the focal plane and having a pair of slots extending longitudinally of an extended portion thereof, said slots being positioned outside of the image area, pinion means, a handcrank for actuating rotation of said pinion means and serving, at a given position, to establish the relative positioning of film feeding mechanism, cam means coaxially mounted with said rotatable pinion means and rigidly connected thereto, arm means pivotally mounted adjacent said cam means and adapted to pivotal rotation during engagement with the maximum radius of said cam, gear means mounted adjacent an extremity of said arm means and adapted to engage said pinion during nonengagement of said cam and arm means, friction roller means coaxially mounted with said last-named gear means and rigidly connected thereto, said roller means in part passing through said slots in the extended portion of said framing plate and being spring-tensioned for frictionally engaging marginal portions of a film unit positioned contiguous therewith for propelling said film unit during the aforesaid nonengagement of said cam and arm means and adapted to be separated from engagement with said marginal film portions during engagement of said cam and arm means, a pin extending from said pivotally mounted arm means, lever means spring-tensioned for contacting said pin and having a slot therein for receiving said pin during pivotal rotation of said arm means whereby said arm and lever may be locked together after a predetermined rotation of said arm means and the aforesaid broken engagement of elements may be maintained, lever release means comprising a depressible handle portion thereof whereby said slot may be withdrawn from said pin and the engagement of separated elements may be reestablished, and means comprising a pair of pressure rollers, one of said rollers having a gear coaxial therewith and rigidly connected thereto continuously engaging said pinion for receiving rotative force therefrom, said pressure rollers being adapted to propel and compress said film unit during nonengagement of said friction roller means with said film unit.

4. Apparatus for treating a multilayer film material comprising a photosensitive layer and a processing fluid releasably contained between a pair of layers thereof, said apparatus comprising, in combination, means for releasably mounting a supply of said film comprising a plurality of areas adapted to exposure, said mounting means positioning said areas so that the same are superposed with respect to one another and so that said areas are successively held in position within said mounting means for exposure to actinic light, means for exposing each said area when thus positioned, rotatable means adapted to engage predetermined surface portions of the film area in exposure position to one side of fluid-containing and exposed portions thereof for advancing each said area after exposure thereof, said advancing means moving only the film area in exposure position, and means comprising a pair of members for first engaging each said film area at a predetermined stage in the advancement thereof by said advancing means and for applying compression to other predetermined surface portions of said film coextensive with fluid-containing portions and exposed areas of said film during further advancement thereof to provide release and spreading of said fluid between said pair of layers for permeating and processing the exposed areas of film.

5. Apparatus for treating a multilayer film unit comprising a photosensitive layer and a processing fluid releasably contained between a pair of layers thereof, said apparatus comprising, in combination, a casing, magazine means mounted within said casing for releasably holding a plurality of said film units in superposed relation, said magazine means holding the foremost of said film units in a position for exposure to actinic light, means for exposing said film units when thus positioned, means mounted exteriorly of said magazine means for advancing said film units from said exposure position after exposure thereof, said advancing means engaging and moving only the foremost film area in its exposure position, and means for first engaging each said film unit at a predetermined stage in the advancement thereof by said advancing means and for applying a compression throughout fluid-bearing and exposed portions of said film units during further advancement thereof to provide release and spreading of said fluid between said pair of layers for permeating and processing the exposed photosensitive layer of film.

6. Apparatus for treating a multilayer film unit comprising a photosensitive layer and a processing fluid releasably contained between a pair of layers thereof, said apparatus comprising, in combination, a casing, magazine means mounted within said casing for releasably holding a plurality of said film units, said magazine means holding the foremost of said film units in a position for exposure to actinic light, means for exposing said foremost film unit when thus positioned, friction roller means mounted exteriorly of said magazine means and capable of partially extending within said magazine means to engage marginal surface portions of only the foremost of said film units to one side of fluid-containing portions and exposed areas thereof when the unit is at exposure position for advancing said film after said exposure to effect a partial displacement from said exposure position, and means comprising a pair of rollers positioned adjacent said friction roller means for first engaging each said film unit at a predetermined stage in the advancement thereof and for applying compression to other surface portions of said film unit at least coextensive with fluid-containing portions and exposed areas of said film during further advancement thereof to provide release and spreading of said fluid between said pair of layers for permeating and processing the exposed areas of film.

7. Apparatus for treating a multilayer film material comprising a photosensitive layer and a processing fluid releasably contained between a pair of layers thereof, said apparatus comprising, in combination, means for releasably mounting a supply of said film so that a plurality of photosensitive areas are superposed and the foremost of said areas is positioned for exposure, rotatable means so located with respect to said mounting means as to engage marginal surface portions of only the foremost of said film areas for displacing said film area from exposure position, means for first engaging each said film area at a predetermined stage in the advancement thereof by said advancing means for applying a compression to portions of said film area lying transversely between said marginal portions, said last-named means being adapted to provide a flow of said fluid between said pair of layers, casing means enclosing aforesaid apparatus, said casing having an aperture adapted to have said film advanced therethrough, means comprising a light-tight chamber attached to said casing and having an aperture adapted to be coupled with the aperture of said casing for transfer of compressed film from said casing to said chamber, and means providing access to the interior of said chamber for removing processed film therefrom.

8. Apparatus for exposing and processing a multilayer film unit comprising a photosensitive layer and a releasably contained fluid interposed between facing areas of a pair of layers thereof, said apparatus comprising, in combination, means for releasably holding a plurality of said units and for successively positioning each unit in a position for photographic exposure of a pre-established photosensitive area thereof, rotatable roller means mounted for bodily movement for frictionally engaging longitudinal marginal surface portions of said units for displacing said units from said exposure position, said roller means being adapted to release engagement with said units prior to complete displacement thereof, rotatable roller means for frictionally engaging surface portions of said displaced units lying between said marginal portions for compressing said interlying portions and for further displacing said units from said exposure position, and means comprising a cam interconnecting said first-named and second-named displacing means for actuating said means, one of said displacing means comprising a cam follower adapted to engage said cam, said cam rendering said displacing means nonoperative during operation of the other displacing means.

9. Apparatus for treating a multilayer film material comprising a photosensitive layer and a processing fluid releasably contained between a pair of layers thereof, said apparatus comprising, in combination, exposure means, a magazine for releasably mounting a supply of said film material comprising a plurality of exposable units, said units being superposed in said magazine with the foremost of the units held in said magazine in position for exposure by said exposure means, advancing means for said units mounted exteriorly of said magazine and capable of partially extending within said magazine to engage and move only said foremost film unit, and means for first engaging each said film unit at a predetermined stage in said advancement thereof, said last-named means applying a compression to at least the exposed area of said film unit to distribute said processing fluid at least throughout the exposed area of the photosensitive layer.

10. Apparatus for treating a multilayer film material comprising a photosensitive layer and a processing fluid releasably contained between a pair of layers thereof, said apparatus comprising, in combination, exposure means, a magazine for releasably mounting a supply of said film material comprising a plurality of exposable units, said magazine having an exposure aperture and another aperture in the front wall portion thereof, said units being superposed in said magazine with the foremost of the units held in said magazine opposite said exposure aperture in position for exposure by said exposure means, advancing means for said units mounted exteriorly of said magazine and capable of partially extending within said magazine through said other aperture to engage and move only said foremost film unit, and means for first engaging each said film unit at a predetermined stage in said advancement thereof, said last-named means applying a compression to at least the exposed area of said film unit to distribute said processing fluid at least throughout the exposed area of the photosensitive layer.

11. Apparatus for treating a multilayer film material comprising a photosensitive layer and a processing fluid releasably contained between a pair of layers thereof, said apparatus comprising, in combination, exposure means, a magazine for releasably mounting a supply of said film material comprising a plurality of exposable units, said units being superposed in said magazine with the foremost of the units held in said magazine in position for exposure by said exposure means, advancing means for said units mounted exteriorly of said magazine and capable of partially extending within said magazine to engage and move only said foremost film unit, and means comprising a pair of pressure rollers for first engaging each said film unit at a predetermined stage in said advancement thereof, said last-named means applying a compression to at least the exposed area of said film unit to distribute said processing fluid at least throughout the exposed area of the photosensitive layer.

12. Apparatus for treating a multilayer film material comprising a photosensitive layer and a processing fluid releasably contained between a pair of layers thereof, said apparatus comprising, in combination, exposure means, a magazine for releasably mounting a supply of said film material comprising a plurality of exposable units, said magazine having an exposure aperture and another aperture in the front wall portion thereof, said units being superposed in said magazine with the foremost of the units held in said magazine opposite said exposure aperture in position for exposure by said exposure means, advancing means for said units, said advancing means including a rotary element, mechanism outside of said magazine for mounting said element for rotation and means for movably mounting said mechanism to cause said element to engage only the foremost of said film units through said other aperture and to advance said film unit out of said magazine, and means for first engaging each said film unit at a predetermined stage in said advancement thereof, said last-named means applying a compression to at least the exposed area of said film unit to distribute said processing fluid at least throughout the exposed area of the photosensitive layer.

13. Apparatus for treating a multilayer film material comprising a photosensitive layer and a processing fluid releasably contained between a pair of layers thereof, said apparatus comprising, in combination, exposure means, a magazine for releasably mounting a supply of said film material comprising a plurality of exposable units, said magazine having an exposure aperture and another aperture in the front wall portion thereof, said units being superposed in said magazine with the foremost of the units held in said magazine opposite said exposure aperture in position for exposure by said means, advancing means for said units, said advancing means including a rotary element, mechanism outside of said magazine for mounting said element for rotation and means for movably mounting said mechanism so that said element can be moved through said aperture into said magazine to engage only the foremost of said film units and to advance said film unit out of said magazine, and means comprising a pair of pressure rollers for first engaging each said film unit at a predetermined stage in said advancement thereof, said last-named means applying a compression to at least the exposed area of said film unit to distribute said processing fluid at least throughout the exposed area of the photosensitive layer.

EDWIN H. LAND.

REFERENCES CITED

The following references are of record in the file of this patent:

UNITED STATES PATENTS

| Number | Name | Date |
|---|---|---|
| 1,070,400 | Brieloff | Aug. 19, 1913 |
| 1,406,653 | Kauser | Feb. 14, 1922 |
| 1,743,616 | Nolan | Jan. 14, 1930 |
| 1,775,643 | Hirsch | Sept. 16, 1930 |

FOREIGN PATENTS

| Number | Country | Date |
|---|---|---|
| 337,784 | Great Britain | Oct. 22, 1930 |
| 470,197 | Great Britain | Aug. 11, 1937 |